(12) United States Patent
Jiang et al.

(10) Patent No.: US 6,259,484 B1
(45) Date of Patent: Jul. 10, 2001

(54) METHOD AND APPARATUS FOR CENTERING A VIDEO SIGNAL ON A DISPLAY SCREEN

(75) Inventors: Libiao Jiang; Masanobu Kimoto, both of San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/165,173

(22) Filed: Oct. 1, 1998

(51) Int. Cl.[7] ............................... H04N 5/04; H04N 3/22; H04N 3/227

(52) U.S. Cl. .......................... 348/511; 348/747; 348/806

(58) Field of Search ........................ 348/511, 745, 348/747, 806, 807, 580, 581; H04N 5/04, 3/22, 3/227

(56) References Cited

U.S. PATENT DOCUMENTS 4,739,403 * 4/1988 Mark ..................................... 348/511

* cited by examiner

Primary Examiner—Sherrie Hsia
(74) Attorney, Agent, or Firm—Blakely, Sokoloff, Taylor & Zafman LLP

(57) ABSTRACT

A method and apparatus for centering an active video signal on a display screen is described. In one embodiment, the method includes calculating an initial positioning value, which corresponds to an initial position of the active video signal on the display screen. A target positioning value is then determined using linear interpolation. The target positioning value is a rough estimate and provides a big pre-jump of the active video signal from the initial position to a target position, which positions the active video signal near the center of the display screen. A bi-sectional fine tuning technique may then be utilized to center the active video signal on the display screen. This method may be performed using a feedback loop that comprises a microcontroller, a digital signal processor, and an on-screen display circuit.

4 Claims, 5 Drawing Sheets

METHOD AND APPARATUS FOR CENTERING A VIDEO SIGNAL ON A DISPLAY SCREEN

BACKGROUND OF THE INVENTION

1. Field of the Invention

The present invention relates generally to the field of display devices, and more specifically, to a method and apparatus for centering an active video signal on a display.

2. Background Information

A display device typically receives a video signal and converts the same into an image for a user to view. The video signal may be received from a variety of sources such as a microprocessor in a computer system, a storage media, or a television transmission. One common display device is the cathode ray tube (CRT) display device.

FIG. 1 illustrates a typical CRT. In CRT, an electron gun 104 shoots an electron beam 108 through a set of magnets 112 to a fluorescent screen 116. When electrons within the electron beam 108 strike the fluorescent screen 116, the energy of the electrons excites a phosphorous coating causing the fluorescent screen 116 to emit light photons 120.

The set of magnets 112 direct where the electron beam 108 strikes the fluorescent screen 116. Typically, the set of magnets 112 includes a top magnet 124 and a bottom magnet 128, and side magnets 132 and 136. Top magnet 124 and bottom magnet 128 move electron beam 108 from the top 130 to the bottom 131 of the fluorescent screen 116, while side magnets 132 and 136 move electron beam 108 in a horizontal direction 138 across fluorescent screen 116. Each sweep of the electron beam 108 in a horizontal direction 138 forms a scan line 140 on fluorescent screen 116. Once a scan line 140 has been formed, the magnets are controlled to move the electron beam to a new starting position 141, allowing the side magnets 132 and 136 to again sweep the electron beam across the surface of the fluorescent screen 116 to form a subsequent scan line 142. By rapidly moving the electron beam across the screen, a series of scan lines forms an image for display on the fluorescent screen 116.

Electronics 144 control the electromagnetic fields created by the set of magnets 112. Electronics 144 also control the firing of electron gun 104. The video electronics 144 typically controls the electron gun by processing video signals arriving from a processor such as a microcomputer 148. However, the current electronics 144 typically have difficulty processing the video signal to precisely center an image. Therefore, the video signal is typically centered manually by adjusting physical controls on the display. Such a technique is imprecise and cumbersome. In addition, continuous or sporadic manual adjustments may be required.

A bi-sectional technique is also employed to converge on a value that centers the active video signal. The bi-sectional technique involves an iterative trial and error process where the picture is moved by a small step in one direction (left or right) until the picture is centered in the middle of the screen 116. However, this technique typically takes several seconds to arrive at the target position. In order to comply with the Microsoft PC-99 Design Guide, the time for signal switching must be completed within two seconds. As such, the bi-sectional technique does not provide an adequate solution for converging on the target value by the required time.

Accordingly, there is a need in the technology for overcoming the drawbacks described above.

SUMMARY OF THE INVENTION

The present invention is a method and apparatus for centering an active video signal on a display screen. In one embodiment, the method includes calculating an initial positioning value, which corresponds to an initial position of the active video signal on the display screen. A target positioning value is then determined using linear interpolation. The target positioning value is a rough estimate and provides a big pre-jump of the active video signal from the initial position to a target position, which positions the active video signal near the center of the display screen. A bi-sectional fine tuning technique may then be utilized to center the active video signal on the display screen. This method may be performed using a feedback loop that comprises a microcontroller, a digital signal processor, and an on-screen display circuit.

DETAILED DESCRIPTION

The present invention is a method and apparatus for centering an active video signal on a display screen. In one embodiment, the method includes calculating an initial positioning value, which corresponds to an initial position of the active video signal on the display screen. A target positioning value is then determined using linear interpolation. The target positioning value is a rough estimate and provides a big pre-jump of the active video signal from the initial position to a target position, which positions the active video signal near the center of the display screen. A bi-sectional fine tuning technique may then be utilized to center the active video signal on the display screen. This method may be performed using a feedback loop that comprises a microcontroller, a digital signal processor, and an on-screen display circuit.

The description includes certain details and describes display device types including liquid crystal display (LCD) devices, cathode ray tube (CRT) devices, plasma display devices, and other forms of converting an electrical signal into a viewable image. The invention also describes sources of video signals such as computer systems, television broadcasts, digital video discs (DVD), videotape, and other sources of video information. Such description and details are provided to provide an understanding of the invention. However, those skilled in the art will appreciate that the invention may be practiced without these specific details and that other embodiments including other well-known methods, procedures, components and circuits which are not described in detailed in detail can be used to implement the described invention. Thus, the details presented in this description should not be used to limit the invention to only the embodiment described.

Figure 1:
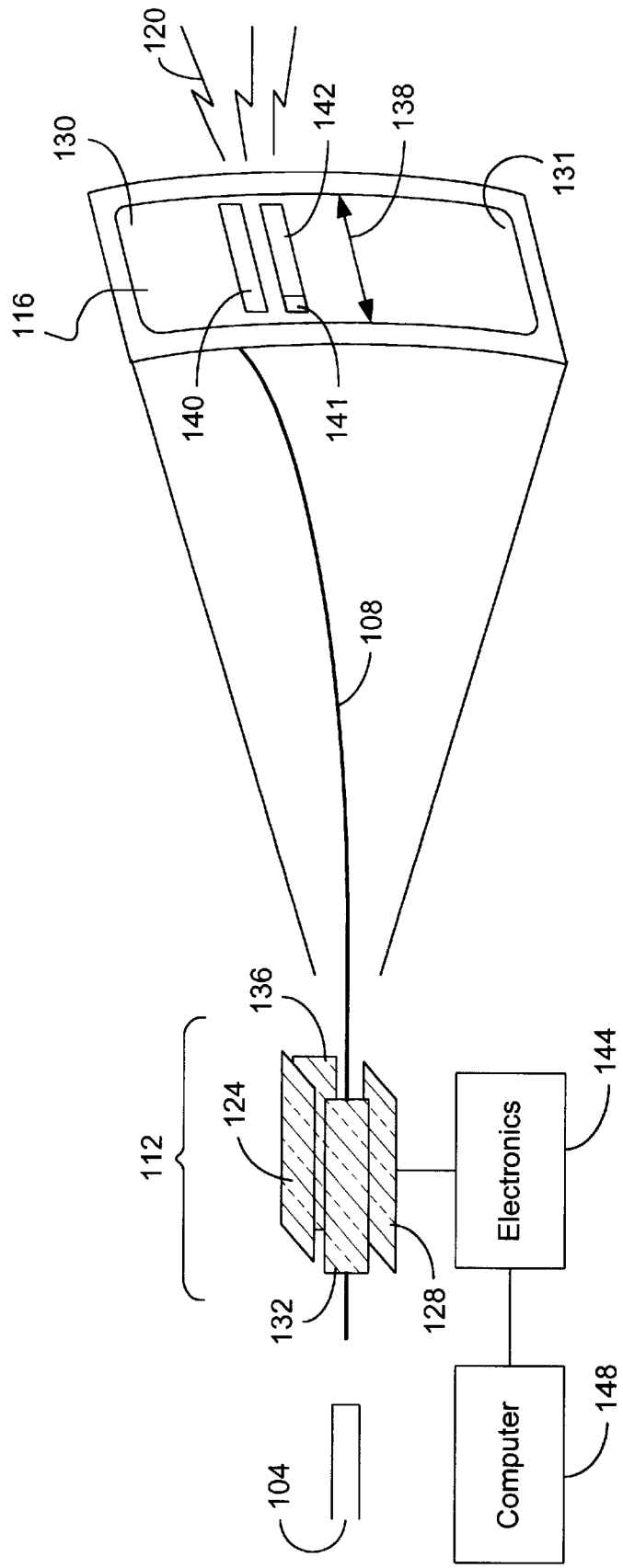
FIG. 1 illustrates a typical cathode ray tube display device.
Figure 2:
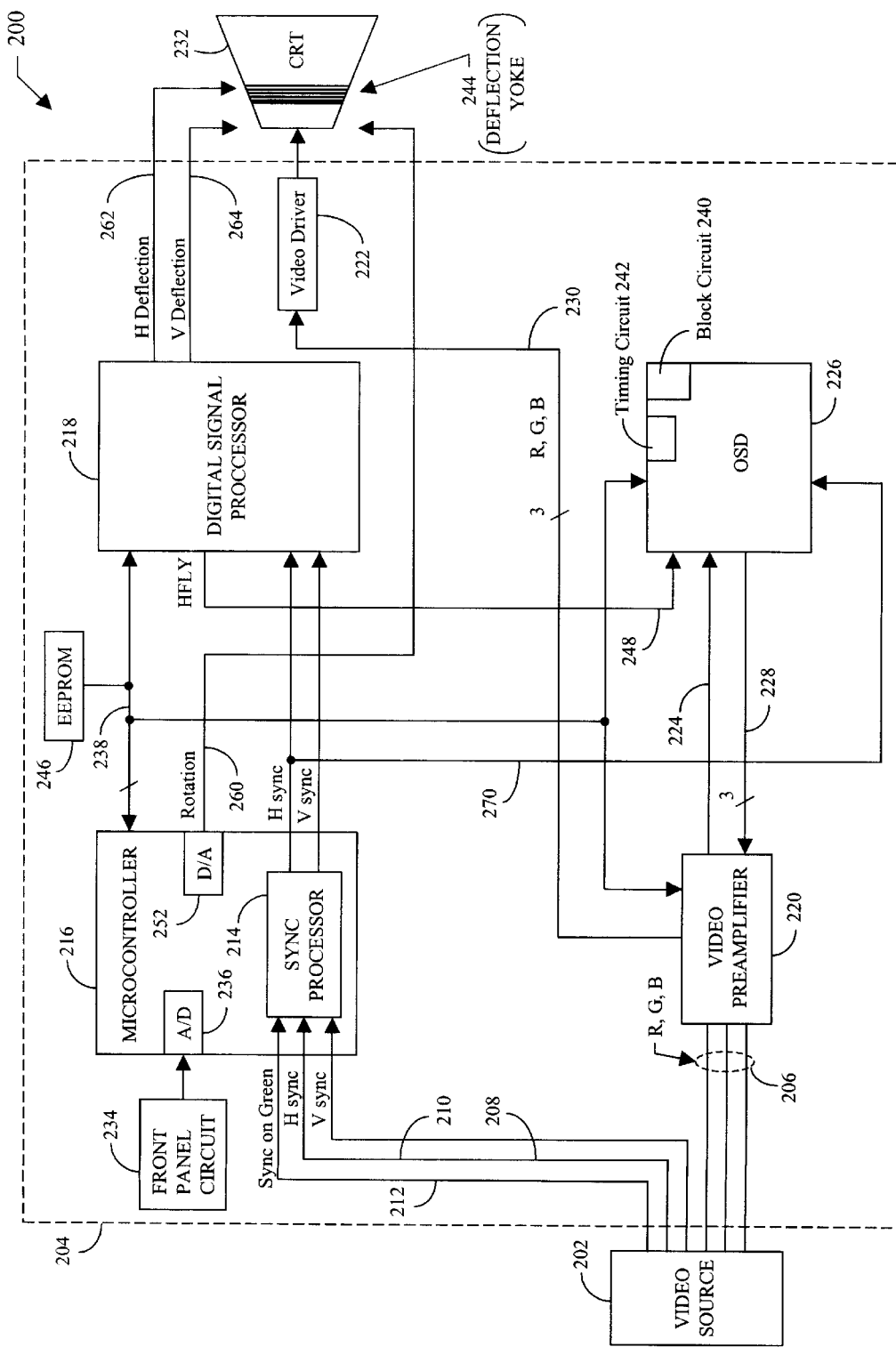
FIG. 2 illustrates a system for processing video information according to one embodiment of the present invention.

FIG. 2 illustrates a system 200 for processing video information according to one embodiment of the present invention. In FIG. 2, video source 202 (e.g., a personal computer) provides a video signal to a video processing circuit 204 along signal lines 206, 208, 210, and 212. Typically, video source 202 provides a vertical sync signal along signal line 208, a horizontal sync signal along signal line 210, and a sync on green signal on signal line 212, all of which are coupled to a sync processor 214 contained within a microcontroller 216. In another embodiment, the sync processor 214 may be external to the microcontroller 216 as a stand-alone device or part of another device. The sync processor 214 processes the incoming sync signals, and extracts HSYNC and VSYNC signals that are in a uniformed format. The HSYNC and VSYNC signals are coupled to a digital signal processor (DSP) 218 for providing deflection and convergence.

The video source 202 also provides a red signal, a green signal, and a blue signal along signal lines 206, which are coupled to a video preamplifier circuit 220. The video preamplifier circuit 220 amplifies the red, green, and blue signals for transmission to a video driver circuit 222. The video preamplifier circuit 220 also combines the red, green, and blue signals to generate an active video signal 230, which indicates the active video time for displaying images. The active video signal is transferred to an on-screen display (OSD) circuit 226 along signal line 224.

The OSD circuit 226 also provides video signals along signal lines 228 to the video preamplifier circuit 220. The video signals on signal lines 228 represent menus to be superimposed, responsive to inputs from a front panel circuit 234, on the video signals received by the video preamplifier circuit 220 on signal lines 206. The front panel circuit 234, which is typically attached to the front of the display, is coupled to the microcontroller 216 by way of an analog-to-digital converter (ADC) 236. In the embodiment shown, the ADC 236 is contained within the microcontroller 216, although it may be external to it. The front panel circuit 234 includes push buttons and/or switches for displaying menus on the CRT 232 and controlling display device parameters such as, but not limited or restricted to, brightness, contrast, horizontal and vertical adjustments, and the like. The microcontroller 216 receives the inputs from the front panel circuit 234 and issues commands to the OSD circuit 226 along a bus 238. The bus includes all signals (address, data, and control) for transmitting data between devices. The bus may be a serial bus or a parallel bus.

Thus, the video preamplifier circuit 220 mixes and superimposes the video signals received from the OSD 226 along signal lines 228, if any, with the red, green, and blue signals on signal lines 206 received from the video source 202, and then amplifies the mixed video signal. The output of the video preamplifier circuit 220 is applied to the video driver circuit 222. The video driver circuit 222 converts the video signal into a larger signal for driving the display device 232, and regulates the strength of the electron beam by adjusting the signal strength.

Continuing to refer to FIG. 2, the microcontroller 216 generates a rotation signal along signal line 260 to the deflection yoke 244 for controlling the tilt. Since the rotation signal is an analog signal, the output of the microcontroller 216 is fed to a digital-to-analog converter (DAC) 252 which converts the digital value into an analog signal. An external electrically erasable read only memory ("EEROM") device 246 is coupled to the microcontroller 216, although such device may be contained therein. The EEPROM device 246 stores a number of predetermined values, which are loaded into the microcontroller 216 upon for example, power up, as will be described below. The microcontroller 216 is coupled to the DSP 218, OSD 226, and the video preamplifier circuit 220 by way of the bus 238.

The DSP 218 generates horizontal and vertical deflection signals along signal lines 262 and 264 to the deflection yoke 244 of the CRT 232 for controlling the electron beam. The DSP 218 also generates a horizontal fly (HFLY) signal, which indicates when the electron beam is to be moved to a new scan line. Thus, when the HFLY signal is asserted, the horizontal deflection signal controls the deflection yoke 244 to move the electron beam to a new scan line. The HFLY signal is also transmitted to the OSD circuit 226 along signal line 248.

To center the active video signal, a feedback loop is utilized which includes the OSD circuit 226, the microcontroller 216, and the DSP 218. The HFLY signal may be adjusted in order to center the active video signal on the screen of the display 232.

The OSD circuit 226 receives the active video signal along signal line 224, the horizontal sync signal from the sync processor along signal line 270, and the HFLY signal from the DSP 218 along signal line 248. In one embodiment of the invention, the OSD circuit 226 measures various time delays between the video signal, the horizontal sync signal, and the HFLY signal, and communicates the measured time delays to the microcontroller 216. The OSD circuit 226 typically includes an OSD clock circuit 240 and timing circuits 242 to measure the time delays between rising and/or falling edges of the various signals.

Figure 3:
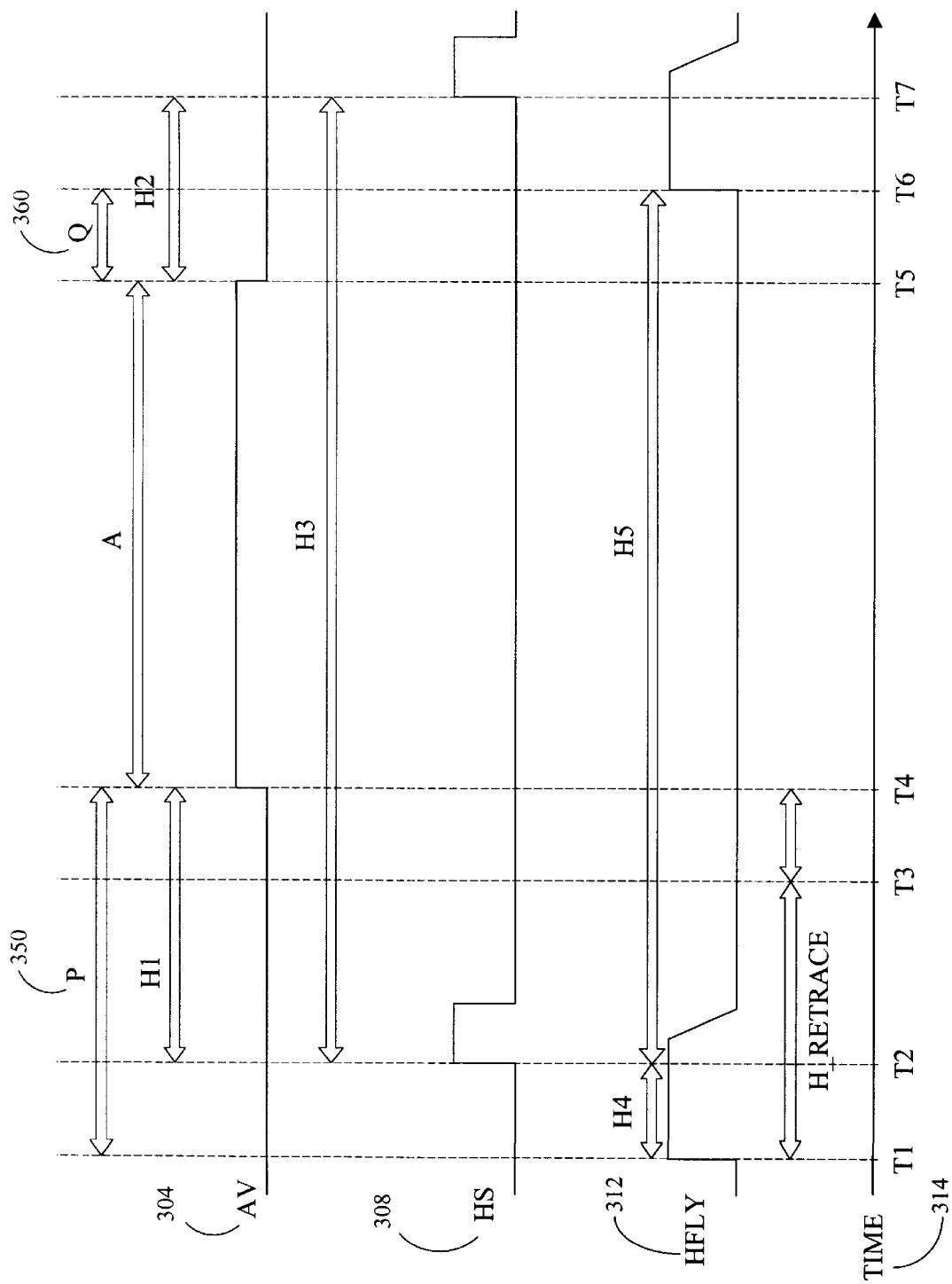
FIG. 3 is a timing diagram illustrating the relationship between an active video signal (AV), a horizontal sync signal (HS), and a horizontal fly signal (HFLY), according to one embodiment of the present invention.

FIG. 3 is a timing diagram illustrating the relationship between an active video signal (AV) 304, a horizontal sync signal (HS) 308, and a horizontal fly signal (HFLY) 312, according to one embodiment of the present invention. The states of the signals at particular points in time along the time axis 314 are illustrated, where significant points are marked as T1, T2, T3, T4, T5, T6 and T7 for reference purposes.

Referring to FIG. 3, the AV signal 304 indicates when along time axis 314 the electron beam in a display device (e.g., CRT 232) switches on to cause elements in the screen to fluoresce. In the illustrated embodiment, an image region of the AV signal 304 is defined by a square pulse between times T4 and T5. Time T4 defines the first edge or left end of an image to be displayed whereas time T5 indicates the second edge or right end of the image to be displayed. In the embodiment shown, the video preamplifier 220 combines the separate red, green, and blue signals into the single AV signal 304. However, in another embodiment, the AV signal 304 may be repeated multiple times, one for each color being transmitted.

The HS signal 308 is a series of square pulses. The rising edges occur at times T2 and T7, where each rising edge indicates the start of a new scan line. Thus, on the rising edge of the horizontal sync signal 308 at time T2, a new scan line begins. The start of new scan lines may also occur on a falling edge of a pulse rather than a rising edge. For purposes of this application, the shape and form of the HS signal 308 are not important, only that the HS signal begins a new scan line.

The HFLY signal 312 determines when the electron beam moves back to a fixed starting point. That is, each rising edge of the HFLY signal 312, occurring at times T1 and T6, causes the electron beam to move to the beginning of a new scan line. The actual movement of the electron beam may be achieved by adjusting the horizontal and vertical deflection signals 262 and 264 in the DSP 218.

In particular, the OSD circuit 226 continuously measures time delays H1–H5. The first time delay H1, occurring between times T2 and T4, is a measure of the time between the start of a horizontal scan line (rising edge of HS signal 308) and the start of the active picture (rising edge of AV signal 304). The second time delay H2, occurring between times T5 and T7, is a measure of the time between the end of the active picture (falling edge of AV signal) and the beginning of a new scan line (rising edge of HS signal). The time period of the HS signal 308 is given by a H3, which occurs between times T2 and T7. A fourth time delay H4, which occurs between times T1 and T2, is a measure of the time between the start of the HFLY signal 312 and the start of the HS signal 308. In addition, a fifth time delay H5, occurring between times T2 and T6, is a measure of the time between the rising edge of the HS signal 308 and the rising edge of the HFLY signal 312.

Typically the period of the HFLY signal 312 between times T1 and T6 is the same as the period of the HS signal 308 between times T2 and T7. However, the HFLY signal 312 is shifted from the HS signal 308 by a phase shift H4. In the illustrated embodiment, the retrace time is given by H-RETRACE, occurring between times T1 and T3. The retrace time is a physical characteristic of a display and is the time it takes the display to start a new scan line. In the case of a CRT display, the retrace time is the time it takes to move the electron beam from an ending position of a scan line to a starting position of a subsequent scan line. The H-RETRACE value for the display 232 is stored in the EEPROM device 246 and is loaded into the microcontroller 216. Due to tolerances of components and other factors, the H-RETRACE value may not be the same for each display of the same display type. Thus, the H-RETRACE value may need to be measured and stored in the EEPROM device 246 for each display during the manufacturing process.

Once the OSD circuit 226 measures the H1–H5 values, they are transmitted to the microcontroller 216. The microcontroller 216 then calculates a P value, which is defined as the time delay between the rising edge of the HFLY signal 312 (time T1) and the rising edge of the AV signal 304 (time T4), and is derived from the equation P=H1+H4. The microcontroller also calculates a Q value, defined as the time delay between the falling edge of the AV signal 403 (time T5) and the rising edge of a subsequent HFLY signal 312 (time T6), and is derived from the equation Q=H2-H4. When the active video region is properly centered, the P and Q values are defined by $P_0$ and $Q_0$ and meet the condition $$P_0 - Q_0 = \text{horizontal retrace time (H-RETRACE)}. \tag{1}$$

To center the active portion A of the AV signal 304 in the screen of display 232, the P-Q value must be adjusted (both of which are a function of the phase shift H4). Thus, in order to change the phase shift H4, the HFLY signal 312 is adjusted.

Initially, the target $P_0$ and $Q_0$ values which satisfy equation (1) are determined empirically by centering the active video signal on the screen, and then determining the $P_0$ and $Q_0$ values that correspond with the centered active video signal. The $P_0$ and $Q_0$ values typically differ from one display type to another, and are determined for each display type. These values are then stored in the EEPROM device 246, and are loaded into a register of the microcontroller 216 (or memory) when needed.

Referring to FIGS. 2 and 3, the microcontroller 216 controls the DSP 218 to adjust the HFLY signal 312. This is done by transmitting a phase value (hereinafter referred to as "HPHASE") from the microcontroller 216 to the DSP 218 by way of the bus 238. The HPHASE value controls the amount of phase shift (either positive or negative) of the HFLY signal 312 with respect to the HS signal 308. That is, as the HPHASE value changes, there is a corresponding phase shift between the HFLY signal 312 and the HS signal 308. The amount of phase shift of the HFLY signal 312 with respect to the HS signal 308, for every unit of the HPHASE value, and the resolution of the HPHASE value are a matter of design choice and may vary from one implementation to another.

When the microcontroller 216 initially powers up or otherwise requires centering of the active video signal, an initial phase shift value $HPHASE_I$ is loaded in a register of the microcontroller 216 from the EEPROM device 246. (It must be noted that once the HPHASE value is changed, for example by the user manually changing the horizontal adjustments of the display, the HPHASE value is stored in the EEPROM device 246.) In any event, the $HPHASE_I$ is transmitted to the DSP 218 via bus 238. The DSP 218 adjusts the HFLY signal in response to $HPHASE_I$. The OSD circuit 226 then measures the H1–H5 values based on the adjusted HFLY signal, and transmits the same to the microcontroller 216. Based on the H1–H5 values, the microcontroller 216 calculates the initial $P_I$ and $Q_I$ values (which are based on the initial phase shift value $HPHASE_I$). With the initial $P_I$ and $Q_I$ values calculated and the target $P_0$ and $Q_0$ values loaded into registers of the microcontroller 216, a target phase shift value $HPHASE_0$ may be determined by:

$$HPHASE_0 = HPHASE_I - [((P_0 - Q_0) - (P_I - Q_I))/\text{slope}]. \tag{2}$$

Figure 4:
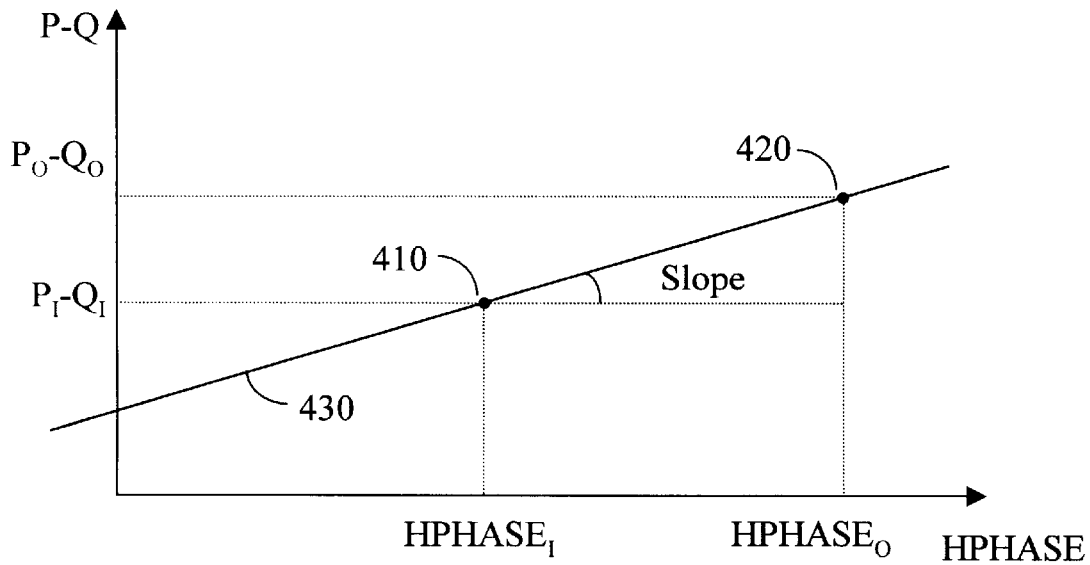
FIG. 4 is a graph illustrating an interpolation technique for calculating a target phase shift value $HPHASE_0$.

FIG. 4 illustrates a graphical representation of equation (2). Referring to FIG. 4, the horizontal axis is labeled as HPHASE while the vertical axis is labeled as P-Q. For a given $P_I - Q_I$ value there is a corresponding $HPHASE_I$ value, at point 410. The $P_0 - Q_0$ value, which is stored in the EEPROM device 246 of FIG. 2, corresponds to the $HPHASE_0$ value at point 420. To calculate $HPHASE_0$, the slope of the line 430 must first be determined. The slope of the line 430 is a function of the period of the HS signal (hereinafter referred to as "HPERIOD"), and is given by the following equation:

$$\text{Slope} = ((\alpha * HPERIOD - \beta)/\gamma) + \epsilon, \tag{3}$$

where $\alpha$, $\beta$, $\gamma$, and $\epsilon$ are all constants, and may be determined empirically. This equation is determined by first assuming that the slope is linear. Then for a number of frequencies, a number of P-Q vs. HPHASE points is plotted. The slope for each frequency is then determined by using a regression technique. A second plot of slope vs. frequency is then made. Equation (3) is then derived using the slope vs. frequency plot. In one embodiment, the value $\alpha$ ranges between 243 to 269, with 256 being a preferred value, $\beta$ ranges between 5228 to 5779 with 5504 being the preferred value, $\gamma$ ranges between 3138 to 3337 with 3469 being the preferred value, and $\epsilon$ ranges between 1 to 3 with 2 being the preferred value. The slope is then stored in the EEPROM device 246 and is loaded into a register (or memory) of the microcontroller 216.

However, the slope in equation (3) is not an exact value but a rough estimate due to equation (3) being determined empirically. As such, when equation (3) is plugged into equation (2), $HPHASE_0$ will not be an exact value but a rough estimate to converge the active video signal near the center of the display screen. A bi-sectional technique may then be used to center the active video signal.

Figure 5:
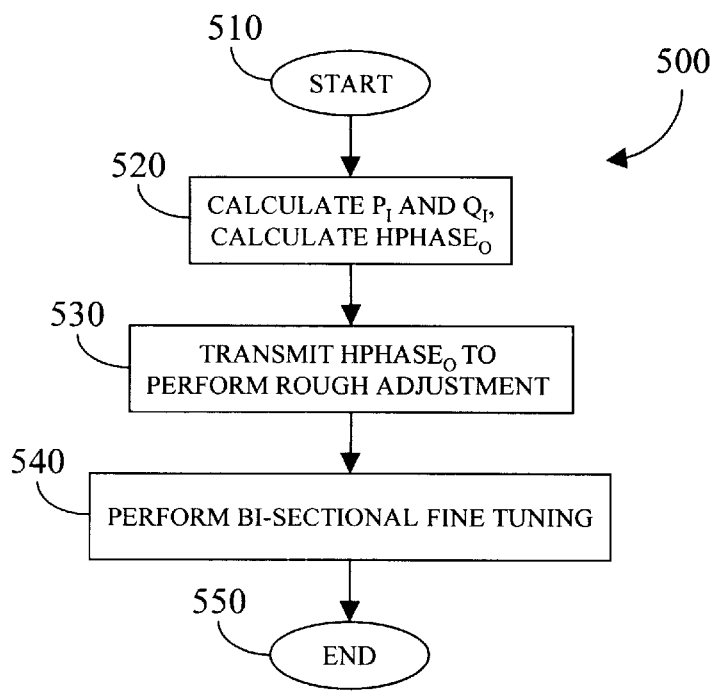
FIG. 5 illustrates a process for centering the active video signal on the screen according to one embodiment of the present invention.

FIG. 5 illustrates a process 500 for centering the active video signal on the screen according to one embodiment of the present invention. Referring to FIG. 5, the process 500 commences at block 510. At block 520, the initial $P_I$ and $Q_I$ values are calculated base on $HPHASE_I$, and the target phase shift value $HPHASE_O$ is determined by equation (3). At block 530, $HPHASE_O$ is transmitted from the microcontroller 216 to the DSP 218, with the latter adjusting the HFLY signal in response thereto. The adjusted HFLY signal then substantially centers the active video signal on the screen. At block 540, a bi-sectional fine-tuning technique is used to center the active video signal on the screen, as will be described in FIG. 6. The process 500 then culminates at block 550. As can be seen, the process of FIG. 5 provides a faster convergence of the active video signal on center of the display screen.

Figure 6:
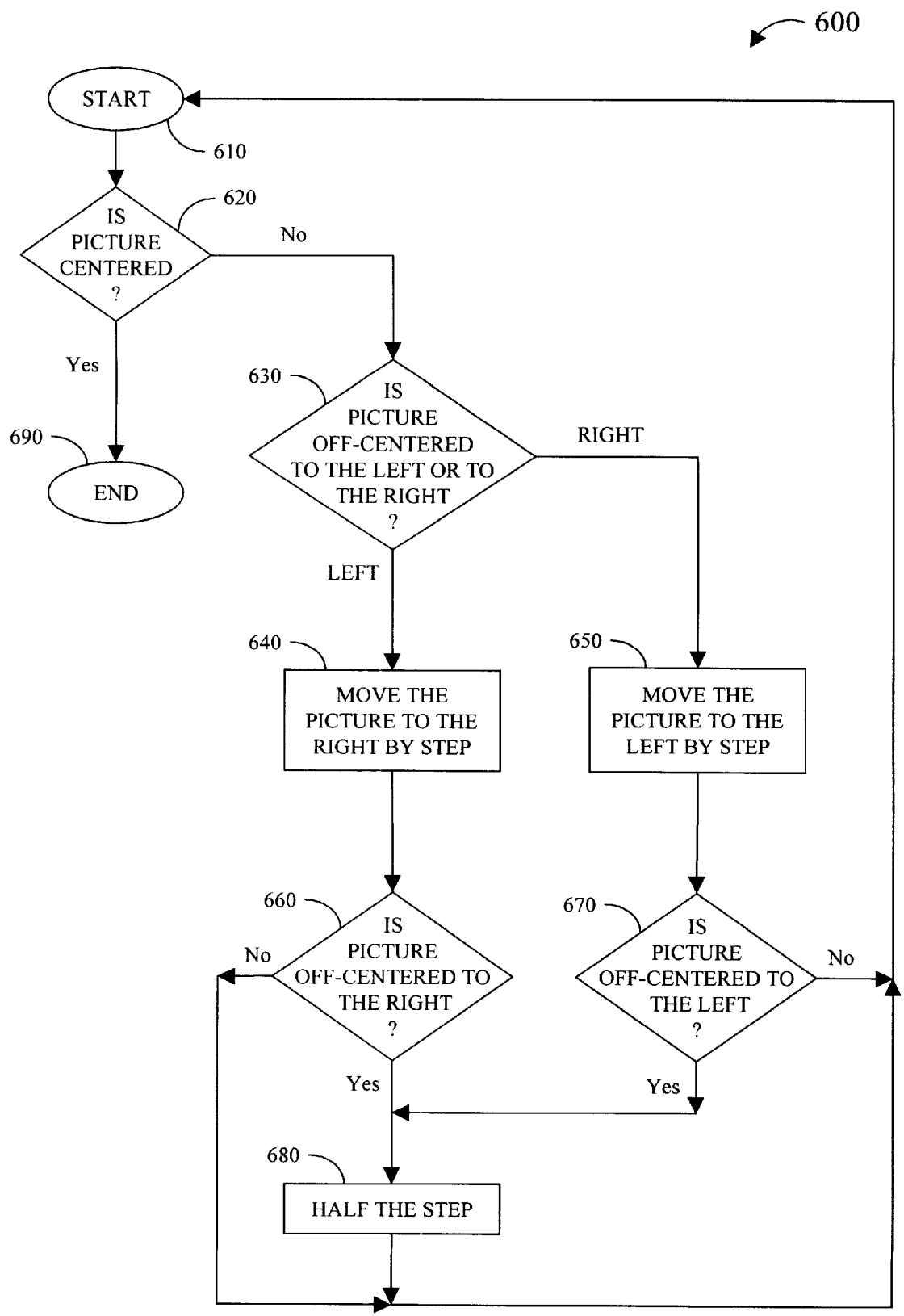
FIG. 6 illustrates a process for centering the active video signal on the screen by utilizing a bi-sectional fine-tuning technique.

FIG. 6 illustrates a process 600 for centering the active video signal on the screen by utilizing a bi-sectional fine-tuning technique. Referring to FIG. 6, the process 600 commences at block 610. At block 620, the process determines whether the active video signal is centered using equation (1) above. An active video signal may be considered centered if P−Q is substantially equal to H-RETRACE (i.e., within a predetermined threshold of H-RETRACE). If the picture is not centered, the process moves to block 630, otherwise the picture is centered and the process ends at block 690. At block 630, it is determined whether the picture is off center to the left or to the right. If the picture is off center to the left, which is the condition where P−Q<H-RETRACE, then the process moves to block 640. At block 640, the picture is moved to the right by a predetermined step amount. At block 660, if the picture is off center to the right, indicating that the predetermined step amount was too large, the process continues to block 680, otherwise the process moves back to block 620 for another iteration.

At block 630, if the picture is off center to the right, which is the condition where P−Q>H-RETRACE, the process moves to block 650. At block 650, the picture is moved to the left by the predetermined step amount. At block 670, if the picture is off center to the left, indicating that the predetermined step amount was too large, the process continues to block 680, otherwise the process moves back to block 620 for another iteration. At block 680, the predetermined step is decreased (e.g., divided by two), and the process moves back to block 620. This process (blocks 620–680) continues until the picture is centered. The process then ends at block 690.

The method and apparatus of the present invention provide a technique which reduces the amount of time for an active video signal to be centered on a display screen.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of centering an active video signal on a display screen, comprising:

calculating an initial positioning value in response to a first phase value, corresponding to an initial position of the active video signal on the display screen;

empirically determining a target positioning value;

calculating a second phase value in response to the initial positioning value, the target positioning value, and the first phase value using linear interpolation; and adjusting the active video signal to a rough target position, in response to the second phase value.

2. The method of claim 1 further comprising using a bi-sectional technique to center the active video signal on the display screen.

3. The method of claim 1 wherein prior to calculating an initial positioning value, the method comprises:

measuring a first time delay between a first edge of a first signal and a first edge of a second signal;

measuring a second time delay from the first edge of the first signal and a first edge of the active video signal; and measuring a third time delay from a second edge of the active video signal to the first edge of the first signal.

4. The method of claim 3 wherein calculating an initial positioning value comprises:

adding the first time delay with the second time delay to provide a P value;

subtracting the first time delay from the third time delay to provide a Q value; and subtracting the Q value from the P value.

\* \* \* \* \*